(12) United States Patent
Johnson et al.

(10) Patent No.: US 11,939,477 B2
(45) Date of Patent: Mar. 26, 2024

(54) HIGH TEMPERATURE HEAT INTEGRATION METHOD OF MAKING CARBON BLACK

(71) Applicant: MONOLITH MATERIALS, INC., Redwood City, CA (US)

(72) Inventors: Peter Louis Johnson, Mountain View, CA (US); Roscoe W. Taylor, San Mateo, CA (US)

(73) Assignee: MONOLITH MATERIALS, INC., Lincoln, NE (US)

( * ) Notice: Subject to any disclaimer, the term of this patent is extended or adjusted under 35 U.S.C. 154(b) by 0 days.

(21) Appl. No.: 15/241,771

(22) Filed: Aug. 19, 2016

(65) Prior Publication Data

US 2017/0058128 A1   Mar. 2, 2017

Related U.S. Application Data

(60) Provisional application No. 62/209,017, filed on Aug. 24, 2015.

(51) Int. Cl.
| | | |
|---|---|---|
| *C09C 1/48* | (2006.01) | |
| *B01J 19/08* | (2006.01) | |
| *C01B 32/05* | (2017.01) | |

(52) U.S. Cl.
CPC ............. *C09C 1/485* (2013.01); *B01J 19/088* (2013.01); *C01B 32/05* (2017.08); *C09C 1/48* (2013.01); *B01J 2219/0871* (2013.01); *B01J 2219/0883* (2013.01); *B01J 2219/0898* (2013.01)

(58) Field of Classification Search
CPC ................................ C09C 1/485; C01B 32/05
See application file for complete search history.

(56) References Cited

U.S. PATENT DOCUMENTS

| | | | |
|---|---|---|---|
| 709,868 | A | 9/1902 | Bradley et al. |
| 1,339,225 | A | 5/1920 | Rose |
| 1,536,612 | A | 5/1925 | Lewis |
| 1,597,277 | A | 8/1926 | Jakowsky |
| 2,062,358 | A | 9/1932 | Frolich |
| 1,931,800 | A | 10/1933 | Jakosky et al. |
| 2,002,003 | A | 5/1935 | Eisenhut et al. |
| 2,039,312 | A | 5/1936 | Goldman et al. |
| 2,393,106 | A | 1/1946 | Johnson et al. |
| 2,557,143 | A | 6/1951 | Royster et al. |
| 2,572,851 | A | 10/1951 | Gardner et al. |
| 2,603,669 | A | 7/1952 | Chappell |
| 2,616,842 | A | 11/1952 | Sheer et al. |
| 2,785,964 | A | 3/1957 | Pollock |
| 2,850,403 | A | 9/1958 | Day |
| 2,851,403 | A | 9/1958 | Hale et al. |
| 2,897,071 | A | 7/1959 | Gilbert et al. |
| 2,897,869 | A | 8/1959 | Polmanteer |
| 2,951,143 | A | 8/1960 | Anderson et al. |
| 3,009,783 | A | 11/1961 | Sheer et al. |
| 3,073,769 | A | 1/1963 | Doukas |
| 3,127,536 | A | 3/1964 | McLane |
| 3,253,890 | A | 5/1966 | De et al. |
| 3,288,696 | A | 11/1966 | Orbach |
| 3,307,923 | A | 3/1967 | Ruble |
| 3,308,164 | A | 3/1967 | Shepard |
| 3,309,780 | A | 3/1967 | Goins |
| 3,331,664 | A | 7/1967 | Jordan |
| 3,342,554 | A | 9/1967 | Jordan et al. |
| 3,344,051 | A | 9/1967 | Latham, Jr. |
| 3,408,164 | A | 10/1968 | Johnson |
| 3,409,403 | A | 11/1968 | Bjornson et al. |
| 3,420,632 | A | 1/1969 | Ryan |
| 3,431,074 | A | 3/1969 | Jordan |
| 3,453,488 | A | 7/1969 | Cann et al. |
| 3,464,793 | A | 9/1969 | Jordan et al. |
| 3,619,138 | A | 11/1971 | Gunnell |
| 3,619,140 | A | 11/1971 | Morgan et al. |
| 3,637,974 | A | 1/1972 | Tajbl et al. |
| 3,673,375 | A | 6/1972 | Camacho et al. |
| 3,725,103 | A | 4/1973 | Jordan et al. |
| 3,852,399 | A | 12/1974 | Rothbuhr et al. |
| 3,922,335 | A | 11/1975 | Jordan et al. |

(Continued)

FOREIGN PATENT DOCUMENTS

| | | |
|---|---|---|
| AU | 28970/71 A | 11/1972 |
| BG | 98848 A | 5/1995 |

(Continued)

OTHER PUBLICATIONS

Non-Final Office Action dated May 2, 2017 in U.S. Appl. No. 14/610,299.
Ex Parte Quayle Action mailed May 19, 2017 in U.S. Appl. No. 14/601,761.
Extended European Search Report from EP Application No. 15742910.1 dated Jul. 18, 2017.
Supplementary Partial European Search Report from EP Application No. 15743214.7 dated Sep. 12, 2017.
ISR and Written Opinion from PCT/US2017/030139, dated Jul. 19, 2017.
ISR and Written Opinion from PCT/US2017/030179, dated Jul. 27, 2017.

(Continued)

*Primary Examiner* — Stuart L Hendrickson
(74) *Attorney, Agent, or Firm* — Wilson Sonsini Goodrich & Rosati

(57) ABSTRACT

A high temperature heat integration method of making carbon black. A method of making carbon black is described, including reacting a carbon black forming feedstock with hydrogen gas in a plasma reactor to produce effluent gas containing carbon black and unused hydrogen, cooling the effluent gas for further processing, and recycling the unused hydrogen back into the carbon black forming process, where the unused hydrogen gas is pre-heated in a heat exchanger to a temperature up to the reaction temperature in the reactor before being recycled into the carbon black forming process. The heat exchanger for use in such process is also described.

13 Claims, 4 Drawing Sheets

(56) References Cited

U.S. PATENT DOCUMENTS

| | | | |
|---|---|---|---|
| 3,959,008 | A | 5/1976 | Warner et al. |
| 3,981,654 | A | 9/1976 | Rood et al. |
| 3,981,659 | A | 9/1976 | Myers |
| 3,984,743 | A | 10/1976 | Horie |
| 3,998,934 | A | 12/1976 | Vanderveen |
| 4,019,896 | A | 4/1977 | Appleby |
| 4,028,072 | A | 6/1977 | Braun et al. |
| 4,035,336 | A | 7/1977 | Jordan et al. |
| 4,057,396 | A | 11/1977 | Matovich |
| 4,075,160 | A | 2/1978 | Mills et al. |
| 4,088,741 | A | 5/1978 | Takewell |
| 4,101,639 | A | 7/1978 | Surovikin et al. |
| 4,138,471 | A | 2/1979 | Lamond et al. |
| 4,199,545 | A | 4/1980 | Matovich |
| 4,282,199 | A | 8/1981 | Lamond et al. |
| 4,289,949 | A | 9/1981 | Raaness et al. |
| 4,292,291 | A * | 9/1981 | Rothbuhr ............... C09C 1/50 423/449.9 |
| 4,317,001 | A | 2/1982 | Silver et al. |
| 4,372,937 | A | 2/1983 | Johnson |
| 4,404,178 | A | 9/1983 | Johnson et al. |
| 4,452,771 | A | 6/1984 | Hunt |
| 4,460,558 | A * | 7/1984 | Johnson ............... C09C 1/487 423/449.5 |
| 4,431,624 | A | 8/1984 | Casperson |
| 4,472,172 | A | 9/1984 | Sheer et al. |
| 4,543,470 | A | 9/1985 | Santen et al. |
| 4,553,981 | A | 11/1985 | Fuderer |
| 4,577,461 | A | 3/1986 | Cann |
| 4,597,776 | A * | 7/1986 | Ullman ............... C10J 3/84 423/655 |
| 4,601,887 | A | 7/1986 | Dorn et al. |
| 4,678,888 | A | 7/1987 | Camacho et al. |
| 4,689,199 | A | 8/1987 | Eckert et al. |
| 4,755,371 | A | 7/1988 | Dickerson |
| 4,765,964 | A | 8/1988 | Gravley et al. |
| 4,766,287 | A | 8/1988 | Morrisroe et al. |
| 4,787,320 | A | 11/1988 | Raaness et al. |
| 4,864,096 | A | 9/1989 | Wolf et al. |
| 4,977,305 | A | 12/1990 | Severance, Jr. |
| 5,039,312 | A | 8/1991 | Hollis, Jr. et al. |
| 5,045,667 | A | 9/1991 | Iceland et al. |
| 5,046,145 | A | 9/1991 | Drouet |
| 5,105,123 | A | 4/1992 | Ballou |
| 5,138,959 | A | 8/1992 | Kulkarni |
| 5,147,998 | A | 9/1992 | Tsantrizos et al. |
| 5,206,880 | A | 4/1993 | Olsson |
| 5,222,448 | A | 6/1993 | Morgenthaler et al. |
| 5,352,289 | A | 10/1994 | Weaver et al. |
| 5,399,957 | A | 3/1995 | Vierboom et al. |
| 5,427,762 | A * | 6/1995 | Steinberg ............ C07C 29/1518 423/449.1 |
| 5,476,826 | A | 12/1995 | Greenwald et al. |
| 5,481,080 | A | 1/1996 | Lynum et al. |
| 5,486,674 | A | 1/1996 | Lynum et al. |
| 5,500,501 | A | 3/1996 | Lynum et al. |
| 5,527,518 | A | 6/1996 | Lynum et al. |
| 5,578,647 | A | 11/1996 | Li et al. |
| 5,593,644 | A | 1/1997 | Norman et al. |
| 5,602,298 | A | 2/1997 | Levin |
| 5,604,424 | A | 2/1997 | Shuttleworth |
| 5,611,947 | A | 3/1997 | Vavruska |
| 5,673,285 | A | 9/1997 | Wittle et al. |
| 5,717,293 | A | 2/1998 | Sellers |
| 5,725,616 | A | 3/1998 | Lynum et al. |
| 5,749,937 | A | 5/1998 | Detering et al. |
| 5,935,293 | A | 8/1999 | Detering et al. |
| 5,951,960 | A | 9/1999 | Lynum et al. |
| 5,989,512 | A | 11/1999 | Lynum et al. |
| 5,997,837 | A | 12/1999 | Lynum et al. |
| 6,042,643 | A | 3/2000 | Belmont et al. |
| 6,058,133 | A | 5/2000 | Bowman et al. |
| 6,068,827 | A | 5/2000 | Lynum et al. |
| 6,099,696 | A | 8/2000 | Schwob et al. |
| 6,188,187 | B1 | 2/2001 | Harlan |
| 6,197,274 | B1 | 3/2001 | Mahmud et al. |
| 6,277,350 | B1 | 8/2001 | Gerspacher |
| 6,358,375 | B1 | 3/2002 | Schwob |
| 6,380,507 | B1 | 4/2002 | Childs |
| 6,395,197 | B1 | 5/2002 | Detering et al. |
| 6,403,697 | B1 | 6/2002 | Mitsunaga et al. |
| 6,441,084 | B1 | 8/2002 | Lee et al. |
| 6,442,950 | B1 | 9/2002 | Tung |
| 6,444,727 | B1 | 9/2002 | Yamada et al. |
| 6,471,937 | B1 | 10/2002 | Anderson et al. |
| 6,602,920 | B2 | 8/2003 | Hall et al. |
| 6,703,580 | B2 | 3/2004 | Brunet et al. |
| 6,773,689 | B1 | 8/2004 | Lynum et al. |
| 6,955,707 | B2 | 10/2005 | Ezell et al. |
| 7,167,240 | B2 | 1/2007 | Stagg |
| 7,294,314 | B2 * | 11/2007 | Graham ............... F28F 9/0239 239/413 |
| 7,312,415 | B2 | 12/2007 | Ohmi et al. |
| 7,360,309 | B2 * | 4/2008 | Vaidyanathan ............ F28F 7/02 264/629 |
| 7,431,909 | B1 * | 10/2008 | Rumpf ............... C09C 1/487 423/449.1 |
| 7,452,514 | B2 | 11/2008 | Fabry et al. |
| 7,462,343 | B2 | 12/2008 | Lynum et al. |
| 7,563,525 | B2 | 7/2009 | Ennis |
| 7,582,184 | B2 | 9/2009 | Tomita et al. |
| 7,623,340 | B1 | 11/2009 | Song et al. |
| 7,635,824 | B2 | 12/2009 | Miki et al. |
| 7,655,209 | B2 | 2/2010 | Rumpf et al. |
| 7,777,151 | B2 | 8/2010 | Kuo |
| 7,847,009 | B2 | 12/2010 | Wong et al. |
| 7,931,712 | B2 | 4/2011 | Zubrin et al. |
| 7,968,191 | B2 | 6/2011 | Hampden-Smith et al. |
| 8,147,765 | B2 | 4/2012 | Muradov et al. |
| 8,221,689 | B2 | 7/2012 | Boutot et al. |
| 8,257,452 | B2 | 9/2012 | Menzel |
| 8,277,739 | B2 | 10/2012 | Monsen et al. |
| 8,323,793 | B2 | 12/2012 | Hamby et al. |
| 8,443,741 | B2 | 5/2013 | Chapman et al. |
| 8,471,170 | B2 | 6/2013 | Li et al. |
| 8,486,364 | B2 | 7/2013 | Vanier et al. |
| 8,501,148 | B2 | 8/2013 | Belmont et al. |
| 8,581,147 | B2 | 11/2013 | Kooken et al. |
| 8,710,136 | B2 | 4/2014 | Yurovskaya et al. |
| 8,771,386 | B2 | 7/2014 | Licht et al. |
| 8,784,617 | B2 | 7/2014 | Novoselov et al. |
| 8,850,826 | B2 | 10/2014 | Ennis |
| 8,871,173 | B2 | 10/2014 | Nester et al. |
| 8,911,596 | B2 | 12/2014 | Vancina |
| 8,945,434 | B2 | 2/2015 | Krause et al. |
| 9,095,835 | B2 | 8/2015 | Skoptsov et al. |
| 9,229,396 | B1 * | 1/2016 | Wu ............... G03G 15/206 |
| 9,315,735 | B2 | 4/2016 | Cole et al. |
| 9,388,300 | B2 | 7/2016 | Dikan et al. |
| 9,445,488 | B2 | 9/2016 | Foret |
| 9,574,086 | B2 | 2/2017 | Johnson et al. |
| 9,679,750 | B2 | 6/2017 | Choi et al. |
| 10,100,200 | B2 | 10/2018 | Johnson et al. |
| 10,138,378 | B2 | 11/2018 | Hoermman et al. |
| 10,370,539 | B2 | 8/2019 | Johnson et al. |
| 10,808,097 | B2 | 10/2020 | Hardman et al. |
| 11,453,784 | B2 | 9/2022 | Hardman et al. |
| 11,492,496 | B2 | 11/2022 | Hoermann et al. |
| 11,665,808 | B2 | 5/2023 | Moss et al. |
| 2001/0029888 | A1 | 10/2001 | Sindarrajan et al. |
| 2001/0039797 | A1 | 11/2001 | Cheng |
| 2002/0000085 | A1 | 1/2002 | Hall et al. |
| 2002/0021430 | A1 | 2/2002 | Koshelev et al. |
| 2002/0050323 | A1 | 5/2002 | Moisan et al. |
| 2002/0051903 | A1 | 5/2002 | Masuko et al. |
| 2002/0141476 | A1 | 10/2002 | Varela |
| 2002/0157559 | A1 | 10/2002 | Brunet et al. |
| 2003/0103858 | A1 | 6/2003 | Baran et al. |
| 2003/0136661 | A1 | 7/2003 | Kong et al. |
| 2003/0152184 | A1 | 8/2003 | Shehane et al. |
| 2004/0045808 | A1 | 3/2004 | Fabry et al. |
| 2004/0047779 | A1 | 3/2004 | Denison |
| 2004/0071626 | A1 | 4/2004 | Smith et al. |
| 2004/0081609 | A1 | 4/2004 | Green et al. |

(56) References Cited

U.S. PATENT DOCUMENTS

| | | |
|---|---|---|
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 | 3/2005 | Ayala et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0228290 A1 | 10/2006 | Green |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0263954 A1 | 10/2008 | Hammel et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0055017 A1 | 3/2010 | Vanier et al. |
| 2010/0147188 A1 | 6/2010 | Mamak et al. |
| 2010/0249353 A1 | 9/2010 | MacIntosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0089115 A1 | 4/2011 | Lu |
| 2011/0120137 A1 | 5/2011 | Ennis |
| 2011/0138766 A1 | 6/2011 | Elkady et al. |
| 2011/0150756 A1 | 6/2011 | Adams et al. |
| 2011/0155703 A1 | 6/2011 | Winn |
| 2011/0180513 A1 | 7/2011 | Luhrs et al. |
| 2011/0214425 A1 | 9/2011 | Lang et al. |
| 2011/0217229 A1 | 9/2011 | Inomata et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0177531 A1 | 7/2012 | Chuang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056127 A1 | 2/2015 | Chavan et al. |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2015/0259211 A9 | 9/2015 | Hung et al. |
| 2015/0307351 A1 | 10/2015 | Mabrouk et al. |
| 2016/0030856 A1 | 2/2016 | Kaplan et al. |
| 2016/0152469 A1 | 6/2016 | Chakravarti et al. |
| 2016/0210856 A1 | 7/2016 | Assenbaum et al. |
| 2016/0243518 A1 | 8/2016 | Spitzl |
| 2016/0293959 A1 | 10/2016 | Blizanac et al. |
| 2016/0296905 A1 | 10/2016 | Kuhl |
| 2016/0319110 A1 | 11/2016 | Matheu et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0117538 A1 | 4/2017 | Bendimerad et al. |
| 2017/0349758 A1 | 12/2017 | Johnson et al. |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2018/0340074 A1 | 11/2018 | Wittmann et al. |
| 2018/0366734 A1 | 12/2018 | Korchev et al. |
| 2019/0048200 A1 | 2/2019 | Johnson et al. |
| 2019/0100658 A1 | 4/2019 | Taylor et al. |
| 2020/0239697 A1 | 7/2020 | Wittmann et al. |
| 2020/0291237 A1 | 9/2020 | Hardman et al. |
| 2021/0017025 A1 | 1/2021 | Hardman |
| 2021/0017031 A1 | 1/2021 | Hardman et al. |
| 2021/0020947 A1 | 1/2021 | Hardman et al. |
| 2021/0071007 A1 | 3/2021 | Hardman et al. |
| 2021/0261417 A1 | 8/2021 | Cardinal et al. |
| 2022/0272826 A1 | 8/2022 | Hoermann et al. |
| 2022/0274046 A1 | 9/2022 | Johnson et al. |
| 2022/0339595 A1 | 10/2022 | Taylor et al. |
| 2023/0136364 A1 | 5/2023 | Johnson et al. |
| 2023/0154640 A1 | 5/2023 | Ned et al. |
| 2023/0212401 A1 | 7/2023 | Hardman et al. |

FOREIGN PATENT DOCUMENTS

| | | |
|---|---|---|
| CA | 830378 A | 12/1969 |
| CA | 964405 A1 | 1/1997 |
| CA | 2 353 752 A1 | 1/2003 |
| CA | 2 621 749 A1 | 8/2009 |
| CN | 85201622 U | 7/1986 |
| CN | 86104761 A | 2/1987 |
| CN | 85109166 A | 4/1987 |
| CN | 1059541 A | 3/1992 |
| CN | 1076206 A | 9/1993 |
| CN | 1077329 A | 10/1993 |
| CN | 1078727 A | 11/1993 |

(56) References Cited

FOREIGN PATENT DOCUMENTS

| | | |
|---|---|---|
| CN | 1082571 A | 2/1994 |
| CN | 1086527 A | 5/1994 |
| CN | 1196032 A | 10/1998 |
| CN | 1398780 A | 2/2003 |
| CN | 1458966 A | 11/2003 |
| CN | 1491740 A | 4/2004 |
| CN | 1644650 A | 7/2005 |
| CN | 1656632 A | 8/2005 |
| CN | 1825531 A | 8/2006 |
| CN | 1833313 A | 9/2006 |
| CN | 101092691 A | 12/2007 |
| CN | 101143296 A | 3/2008 |
| CN | 101193817 A | 6/2008 |
| CN | 101198442 A | 6/2008 |
| CN | 201087175 Y | 7/2008 |
| CN | 201143494 Y | 11/2008 |
| CN | 101368010 A | 2/2009 |
| CN | 101529606 A | 9/2009 |
| CN | 101534930 A | 9/2009 |
| CN | 101657283 A | 2/2010 |
| CN | 101734620 A | 6/2010 |
| CN | 101946080 A | 1/2011 |
| CN | 101958221 A | 1/2011 |
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |
| CN | 102666686 A | 9/2012 |
| CN | 102702801 A | 10/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 104798228 A | 7/2015 |
| CN | 105070518 A | 11/2015 |
| CN | 105073906 A | 11/2015 |
| CN | 105308775 A | 2/2016 |
| CN | 205472672 U | 8/2016 |
| CN | 107709474 A | 2/2018 |
| DE | 211457 A3 | 7/1984 |
| DE | 198 07 224 A1 | 8/1999 |
| DE | 19807224 A1 | 8/1999 |
| EA | 200300389 | 12/2003 |
| EA | 200300389 A1 | 12/2003 |
| EP | 0315442 A2 | 5/1989 |
| EP | 0 325 689 A1 | 8/1989 |
| EP | 0 616 600 A1 | 9/1994 |
| EP | 0 635 044 B1 | 2/1996 |
| EP | 0 635 043 B1 | 6/1996 |
| EP | 0 861 300 A1 | 9/1998 |
| EP | 0982378 A1 | 3/2000 |
| EP | 1017622 A1 | 7/2000 |
| EP | 1 188 801 A1 | 3/2002 |
| EP | 1 088 854 A2 | 4/2010 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| EP | 3612600 A1 | 2/2020 |
| EP | 3676220 A1 | 7/2020 |
| EP | 3676335 A1 | 7/2020 |
| EP | 3676901 A1 | 7/2020 |
| EP | 3700980 A1 | 9/2020 |
| EP | 3774020 A1 | 2/2021 |
| EP | 4225698 A1 | 8/2023 |
| FR | 1249094 A | 12/1960 |
| FR | 2 891 434 A1 | 3/2007 |
| FR | 2 937 029 A1 | 4/2010 |
| GB | 395 893 A | 7/1933 |
| GB | 987498 | 3/1965 |
| GB | 1068519 | 5/1967 |
| GB | 1291487 A | 10/1972 |
| GB | 1 400 266 A | 7/1975 |
| GB | 1 492 346 A | 11/1977 |
| GB | 2419883 A | 5/2006 |
| JP | S5021983 B1 | 7/1975 |
| JP | S5987800 A | 5/1984 |
| JP | S6411074 A | 1/1989 |
| JP | 4-228270 A | 8/1992 |
| JP | H05226096 A | 9/1993 |
| JP | H06302527 A | 10/1994 |
| JP | 6-322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | 9-316645 A | 12/1997 |
| JP | 11-123562 A | 5/1999 |
| JP | 2001164053 A | 6/2001 |
| JP | 2001253974 A | 9/2001 |
| JP | 2002121422 A | 4/2002 |
| JP | 2004-300334 A | 10/2004 |
| JP | 3636623 B2 | 4/2005 |
| JP | 2005-235709 A | 9/2005 |
| JP | 2005-243410 A | 9/2005 |
| JP | 5226096 B2 | 7/2013 |
| KR | 20030046455 A | 6/2003 |
| KR | 10-2008-105344 A | 12/2008 |
| KR | 2014-0075261 A | 6/2014 |
| KR | 20150121142 A | 10/2015 |
| KR | 20170031061 A | 3/2017 |
| RU | 2425795 | 8/2011 |
| RU | 2425795 C2 | 8/2011 |
| RU | 2488984 | 7/2013 |
| RU | 2488984 C2 | 7/2013 |
| TW | 200418933 A | 10/2004 |
| WO | WO-9004852 A1 | 5/1990 |
| WO | WO-9204415 A1 | 3/1992 |
| WO | 93/12031 A1 | 6/1993 |
| WO | WO-9312030 A1 | 6/1993 |
| WO | WO-9312633 A1 | 6/1993 |
| WO | 93/18094 A1 | 9/1993 |
| WO | WO-9318094 A1 | 9/1993 |
| WO | 93/20153 A1 | 10/1993 |
| WO | WO-9320152 A1 | 10/1993 |
| WO | 93/23331 A1 | 11/1993 |
| WO | 1994/008747 A1 | 4/1994 |
| WO | WO-9618688 A1 | 6/1996 |
| WO | 97/03133 A1 | 1/1997 |
| WO | 98/13428 A1 | 4/1998 |
| WO | WO-0018682 A1 | 4/2000 |
| WO | WO-0224819 A1 | 3/2002 |
| WO | 03/014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2009143576 A1 | 12/2009 |
| WO | WO-2010040840 A2 | 4/2010 |
| WO | WO-2010059225 A1 | 5/2010 |
| WO | 2012/015313 A1 | 2/2012 |
| WO | 2012/067546 A2 | 5/2012 |
| WO | 2012/094743 A1 | 7/2012 |
| WO | 2012/149170 A1 | 11/2012 |
| WO | 2013/134093 A1 | 9/2013 |
| WO | WO-2013134093 A1 | 9/2013 |
| WO | 2013/184074 A1 | 12/2013 |
| WO | 2013/185219 A1 | 12/2013 |
| WO | 2014/000108 A1 | 1/2014 |
| WO | 2014/012169 A1 | 1/2014 |
| WO | WO-2014149455 A1 | 9/2014 |

(56) References Cited

FOREIGN PATENT DOCUMENTS

| | | |
|---|---|---|
| WO | 2015/049008 A1 | 4/2015 |
| WO | WO-2015051893 A1 | 4/2015 |
| WO | WO-2015051898 A1 | 4/2015 |
| WO | 2015/093947 A1 | 6/2015 |
| WO | 2015/116797 A1 | 8/2015 |
| WO | 2015/116798 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | 2016/014641 A1 | 8/2016 |
| WO | 2016/126598 A1 | 8/2016 |
| WO | 2016/126599 A1 | 8/2016 |
| WO | 2016/126600 A1 | 8/2016 |
| WO | 2017/019683 A1 | 2/2017 |
| WO | 2017/027385 A1 | 2/2017 |
| WO | 2017/034980 A1 | 3/2017 |
| WO | 2017/044594 A1 | 3/2017 |
| WO | 2017/048621 A1 | 3/2017 |
| WO | WO-2017034980 A1 | 3/2017 |
| WO | WO-2017044594 A1 | 3/2017 |
| WO | WO-2017048621 A1 | 3/2017 |
| WO | 2017/190015 A1 | 11/2017 |
| WO | 2017/190045 A1 | 11/2017 |
| WO | WO-2017190015 A1 | 11/2017 |
| WO | WO-2017190045 A1 | 11/2017 |
| WO | 2018/0165483 A1 | 9/2018 |
| WO | 2018/195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |
| WO | WO-2022076306 | 4/2022 |
| WO | WO-2023059520 | 4/2023 |
| WO | WO-2023137120 A1 | 7/2023 |

OTHER PUBLICATIONS

Reese, J. (2017). Resurgence in American manufacturing will be led by the rubber and tire industry. Rubber World. 255. 18-21 and 23.
Non-Final Office Action dated Feb. 27, 2017 in U.S. Appl. No. 14/591,476.
Extended European Search Report from EP Application No. 15743214.7 dated Jan. 16, 2018.
Chiesa P, Lozza G, Mazzocchi L. Using Hydrogen as Gas Turbine Fuel. ASME. J. Eng. Gas Turbines Power. 2005;127(1):73-80. doi:10.1115/1.1787513.
Tsujikawa, Y., and T. Sawada. "Analysis of a gas turbine and steam turbine combined cycle with liquefied hydrogen as fuel." International Journal of Hydrogen Energy 7.6 (1982): 499-505.
Search report from RU2016135213, dated Feb. 12, 2018.
Non-Final Office Action dated Jan. 16, 2018 in U.S. Appl. No. 14/591,528.
Bakken, Jon Arne, et al. "Thermal plasma process development in Norway." Pure and applied Chemistry 70.6 (1998): 1223-1228.
Polman, E. A., J. C. De Laat, and M. Crowther. "Reduction of CO2 emissions by adding hydrogen to natural gas." IEA Green House Gas R&D programme (2003).
Verfondern, K., "Nuclear Energy for Hydrogen Production", Schriften des Forschungzentrum Julich, vol. 58, 2007.
U.S. Environmental Protection Agency, "Guide to Industrial Assessments for Pollution Prevention and Energy Efficiency," EPA 625/R-99/003, 1999.
Breeze, P. "Raising steam plant efficiency-Pushing the steam cycle boundaries." PEI Magazine 20.4 (2012).
Final Office Action dated Oct. 13, 2017 in U.S. Appl. No. 14/591,476.
Final Office Action dated Oct. 13, 2017 in U.S. Appl. No. 14/591,541.
Notice of Allowance dated Jan. 18, 2018 in U.S. Appl. No. 14/601,761.
Correced Notice of Allowance dated Feb. 9, 2018 in U.S. Appl. No. 14/601,761.
Final Office Action dated Sep. 19, 2017 in U.S. Appl. No. 15/221,088.
Non-Final Office Action dated Jan. 9, 2018 in U.S. Appl. No. 15/259,884.
Russian Official Notification of Application No. 2016135213 from Russia dated Feb. 12, 2018.
Non-Final Office Action dated Mar. 16, 2016 in U.S. Appl. No. 14/591,476.
Final Office Action dated Jul. 11, 2016 in in U.S. Appl. No. 14/591,476.
Non-Final Office Action dated Mar. 16, 2016 in U.S. Appl. No. 14/591,541.
Final Office Action dated Jul. 14, 2016 in U.S. Appl. No. 14/591,541.
Non-Final Office Action dated Apr. 14, 2016 in U.S. Appl. No. 14/601,761.
Final Office Action dated Oct. 19, 2016 in U.S. Appl. No. 14/601,761.
Non-Final Office Action dated Apr. 13, 2016 in U.S. Appl. No. 14/601,793.
Final Office Action dated Aug. 3, 2016 in U.S. Appl. No. 14/601,793.
Notice of Allowance dated Oct. 7, 2016 in U.S. Appl. No. 14/601,793.
Non-Final Office Action dated Dec. 23, 2016 in U.S. Appl. No. 15/221,088.
Non-Final Office Action dated Apr. 20, 2018 in U.S. Appl. No. 15/221,088.
ISR and Written Opinion from PCT/US2015/013482, dated Jun. 17, 2015.
ISR and Written Opinion from PCT/US2015/013505, dated May 11, 2015.
ISR and Written Opinion from PCT/US2015/013487, dated Jun. 16, 2015.
Donnet, Basal and Wang, "Carbon Black", New York: Marcel Dekker, 1993 pp. 46, 47 and 54.
Boehm, HP, "Some Aspects of Surface Chemistry of Carbon Blacks and Other Carbons", Carbon 1994, p. 759.
"Carbon Black Elastomer Interaction" Rubber Chemistry and Technology, 1991, pp. 19-39.
"The Impact of a Fullerene-Like Concept in Carbon Black Science", Carbon, 2002, pp. 157-162.
ISR and Written Opinion from PCT/US2015/013510, dated Apr. 22, 2015.
ISR and Written Opinion from PCT/US2016/015939, dated Jun. 3, 2016.
ISR and Written Opinion from PCT/US2016/015941, dated Feb. 22, 2016.
ISR and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2015/013484, dated Apr. 22, 2015.
AP 42, Fifth Edition, vol. I, Chapter 6: Organic Chemical Process Industry, Section 6.1: Carbon Black.
Fulcheri, et al. "Plasma processing: a step towards the production of new grades of carbon black. " Carbon 40.2 (2002): 169-176.
Grivei, et al. A clean process for carbon nanoparticles and hydrogen production from plasma hydrocarbon cracking. Publishable Report, European Commission Joule III Programme, Project No. JOE3-CT97-0057, circa 2000.
Fabry, et al. "Carbon black processing by thermal plasma. Analysis of the particle formation mechanism." Chemical Engineering Science 56.6 (2001): 2123-2132.
Pristavita, et al. "Carbon nanoparticle production by inductively coupled thermal plasmas: controlling the thermal history of particle nucleation." Plasma Chemistry and Plasma Processing 31.6 (2011): 851-866.

(56) References Cited

OTHER PUBLICATIONS

Cho, et al. "Conversion of natural gas to hydrogen and carbon black by plasma and application of plasma black." Symposia—American Chemical Society, Div. Fuel Chem. vol. 49. 2004.
Pristavita, et al. "Carbon blacks produced by thermal plasma: the influence of the reactor geometry on the product morphology." Plasma Chemistry and Plasma Processing 30.2 (2010): 267-279.
Pristavita, et al. "Volatile Compounds Present in Carbon Blacks Produced by Thermal Plasmas." Plasma Chemistry and Plasma Processing 31.6 (2011): 839-850.
Garberg, et al. "A transmission electron microscope and electron diffraction study of carbon nanodisks." Carbon 46.12 (2008): 1535-1543.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Høyer, et al. "Microelectromechanical strain and pressure sensors based on electric field aligned carbon cone and carbon black particles in a silicone elastomer matrix." Journal of Applied Physics 112.9 (2012): 094324.
Naess, Stine Nalum, et al. "Carbon nanocones: wall structure and morphology." Science and Technology of advanced materials (2016), 7 pages.
Fulcheri, et al. "From methane to hydrogen, carbon black and water." International journal of hydrogen energy 20.3 (1995): 197-202.
ISR and Written Opinion from PCT/US2016/047769, dated Dec. 30, 2016.
D.L. Sun, F. Wang, R.Y. Hong, C.R. Xie, Preparation of carbon black via arc discharge plasma enhanced by thermal pyrolysis, Diamond & Related Materials (2015), doi: 10.1016/j.diamond.2015.11.004, 47 pages.
ISR and Written Opinion from PCT/US2015/013794, dated Jun. 19, 2015.
Donnet et al. "Observation of Plasma-Treated Carbon Black Surfaces by Scanning Tunnelling Microscopy," Carbon (1994) 32(2):199-206.
Larouche et al. "Nitrogen Functionalization of Carbon Black in a Thermo-Convective Plasma Reactor," Plasma Chem Plasma Process (2011) 31:635-647.
Reynolds, "Electrode Resistance: How Important is Surface Area" Oct. 10, 2016. p. 3 ¶[0001]; Fig. 3; Retrieved from http://electrofishing.net/2016/10/10/electrode-resistance-how-important-is-surface-area/ on Aug. 5, 2018.
Wikipedia "Heating Element" Oct. 14, 2016. Page 1 para[0001]. Retrieved from https://en.wikipedia.org/w/index.php?title=Heating_element&oldid=744277540 on May 9, 2018.
Wikipedia "Joule Heating" Jan. 15, 2017. Page 1 para[0002]. Retrieved from https://en.wikipedia.org/w/index.php?title=Joule_heating&oldid=760136650 on May 9, 2018.
Extended European Search Report from EP Application No. 16747055.8 dated Jun. 27, 2018.
Extended European Search Report from EP Application No. 16747056.6 dated Jun. 27, 2018.
Extended European Search Report from EP Application No. 16747057.4 dated Oct. 9, 2018.
Extended European Search Report from EP Application No. 16835697.0 dated Nov. 28, 2018.
Final Office Action from U.S. Appl. No. 15/259,884, dated Oct. 11, 2018.
Invitation to Pay Additional Fees dated Jun. 18, 2018 in PCT/US2018/028619.
IPRP from PCT/US2015/013482, dated Aug. 2, 2016.
IPRP from PCT/US2017/030139 dated Oct. 30, 2018.
IPRP from PCT/US2017/030179 dated Oct. 30, 2018.
ISR and Written Opinion for PCT/US2018/048374 dated Nov. 26, 2018.
ISR and Written Opinion for PCT/US2018/048378 dated Dec. 20, 2018.
ISR and Written Opinion for PCT/US2018/048381 dated Dec. 14, 2018.
ISR and Written Opinion from PCT/US2018/021627, dated May 31, 2018.
ISR and Written Opinion from PCT/US2018/028619, dated Aug. 9, 2018.
Non-Final Office Action dated Jun. 1, 2018 in U.S. Appl. No. 15/262,539.
Non-Final Office Action dated Jun. 7, 2018 in U.S. Appl. No. 14/591,476.
Non-Final Office Action dated Jun. 7, 2018 in U.S. Appl. No. 15/410,283.
Non-Final Office Action from U.S. Appl. No. 15/548,352 dated Oct. 10, 2018.
Notice of Allowance dated Jun. 19, 2018 in U.S. Appl. No. 14/601,761.
Notice of Allowance dated Jun. 7, 2018 in U.S. Appl. No. 14/591,541.
Final Office Action for U.S. Appl. No. 15/262,539 dated Jan. 4, 2019.
Gago et al., "Growth mechanisms and structure of fullerene-like carbon-based thin films: superelastic materials for tribological applications," Trends in Fullerene Research, Published by Nova Science Publishers, Inc. (2007), pp. 1-46.
Co-pending U.S. Appl. No. 16/807,550, filed Mar. 3, 2020.
EP17790549.4 Extended European Search Report dated Nov. 26, 2019.
EP17790570.0 Extended European Search Report dated Nov. 8, 2019.
Medalia, et al., Tinting Strength of Carbon Black. Journal of Colloid and Interface Science 40.2. (1972).
U.S. Appl. No. 15/548,346 Office Action dated Oct. 22, 2019.
U.S. Appl. No. 14/591,528 Office Action dated Oct. 28, 2019.
U.S. Appl. No. 14/610,299 Notice of Allowance dated Feb. 20, 2020.
U.S. Appl. No. 15/221,088 Office Action dated Dec. 4, 2019.
U.S. Appl. No. 15/229,608 Office Action dated Oct. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/262,539 Office Action dated Sep. 19, 2019.
U.S. Appl. No. 15/410,283 Office Action dated Jan. 16, 2020.
U.S. Appl. No. 15/548,348 Notice of Allowance dated Dec. 12, 2019.
U.S. Appl. No. 15/548,352 Office Action dated Jan. 31, 2020.
U.S. Appl. No. 16/159,144 Office Action dated Mar. 26, 2020.
U.S. Appl. No. 15/548,348 Office Action dated Apr. 25, 2019.
U.S. Appl. No. 14/591,541 Notice of Allowance dated Sep. 17, 2018.
Bakken, et al., Thermal plasma process development in Norway. Pure and Applied Chemistry 70.6 (1998): 1223-1228.
Biscoe, et al., An X-ray study of carbon black. Journal of Applied physics, 1942; 13: 364-371.
Breeze, Raising steam plant efficiency-Pushing the steam cycle boundaries.PEI Magazine 20.4 (2012) 12 pages.
Chiesa, et al., Using Hydrogen as Gas Turbine Fuel. ASME. J. Eng. Gas Turbines Power 127.1. (2005):73-80. doi:10.1115/1.1787513.
Co-pending U.S. Appl. No. 16/097,035, filed Oct. 26, 2018.
Co-pending U.S. Appl. No. 16/180,635, filed Nov. 5, 2018.
Co-pending U.S. Appl. No. 16/445,727, filed Jun. 19, 2019.
Co-pending U.S. Appl. No. 16/563,008, filed Sep. 6, 2019.
EP16845031.0 Extended European Search Report dated Mar. 18, 2019.
EP16847102.7 Extended European Search Report dated Jul. 5, 2019.
Extended European Search Report for EP Application No. 15742910.1 dated Jul. 18, 2017.
Extended European Search Report for EP Application No. 15743214.7 dated Jan. 16, 2018.
Garberg, et al., A transmission electron microscope and electron diffraction study of carbon nanodisks. Carbon 46 (2008) 1535-1543.

(56) References Cited

OTHER PUBLICATIONS

Hernandez, et al. Comparison of carbon nanotubes and nanodisks as percolative fillers in electrically conductive composites. Scripta Materialia 58 (2008) 69-72.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Search Report and Written Opinion for Application No. PCT/US2017/030139 dated Jul. 19, 2017.
International Search Report and Written Opinion for Application No. PCT/US2017/030179 dated Jul. 27, 2017.
International Search Report for Application No. PCT/US2015/13482 dated Jun. 17, 2015.
International Search Report for Application No. PCT/US2015/13487 dated Jun. 16, 2015.
PCT/US2018/021627 International Search Report and Written Opinion dated May 31, 2018.
PCT/US2018/028619 International Search Report and Written Opinion dated Aug. 9, 2018.
PCT/US2018/048374 International Search Report and Written Opinion dated Nov. 21, 2018.
PCT/US2018/048378 International Search Report and Written Opinion dated Dec. 20, 2018.
PCT/US2018/048381 International Search Report and Written Opinion dated Dec. 14, 2018.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
Polman, et al., Reduction of CO2 emissions by adding hydrogen to natural gas. IEA Green House Gas R&D programme (2003): 1-98.
Reese, Resurgence in American manufacturing will be led by the rubber and tire industry. Rubber World. 255. (2017): 18-21 and 23.
Supplementary Partial European Search Report for EP Application No. 15743214.7 dated Sep. 12, 2017.
Tsujikawa, et al., Analysis of a gas turbine and steam turbine combined cycle with liquefied hydrogen as fuel. International Journal of Hydrogen Energy 7.6 (1982): 499-505.
U.S. Environmental Protection Agency, Guide to Industrial Assessments for Pollution Prevention and Energy Efficiency. EPA 625/R-99/003 (1999): 474 pages.
U.S. Appl. No. 14/591,528 Office Action dated Jan. 17, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Oct. 13, 2017.
U.S. Appl. No. 14/591,528 Office Action dated Jan. 16, 2018.
U.S. Appl. No. 14/591,541 Office Action dated Feb. 22, 2017.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Actionn dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Mar. 7, 2019.
U.S. Appl. No. 15/229,608 Office Action dated Apr. 8, 2019.
U.S. Appl. No. 15/241,771 Office Action dated Mar. 13, 2019.
U.S. Appl. No. 15/259,884 Office Action dated May 31, 2019.
U.S. Appl. No. 15/410,283 Office Action dated Mar. 12, 2019.
U.S. Appl. No. 15/410,283 Office Action dated Jun. 7, 2018.
U.S. Appl. No. 15/548,352 Office Action dated May 9, 2019.
Verfondern, Nuclear Energy for Hydrogen Production. Schriften des Forschungzentrum Julich 58 (2007): 4 pages.
PCT/US2023/024148 International Search Report and Written Opinion dated Sep. 27, 2023.
U.S. Appl. No. 16/802,174 Office Action dated Oct. 4, 2023.
U.S. Appl. No. 17/819,075 Office Action dated Oct. 5, 2023.
U.S. Appl. No. 17/938,591 Office Action dated Sep. 25, 2023.
ASTM International Designation: D6556-14. Standard Test Method for Carbon Black—Total and External Surface Area by Nitrogen Adsorption1, 2014. 5 Pages.
ASTM International: Standard Test Method for Carbon Black—Morphological Characterization of Carbon Black Using Electron Microscopy, D3849-07 (2011); 7 Pages.
Carmer, et al., Formation of silicon carbide particles behind shock waves. Appl. Phys. Lett. 54 (15), Apr. 10, 1989. 1430-1432.
Co-pending U.S. Appl. No. 17/021,197, inventors Hardman; Ned J. et al., filed on Sep. 15, 2020.
Co-pending U.S. Appl. No. 17/031,484, inventors Johnson; Peter L. et al., filed on Sep. 24, 2020.
Co-pending U.S. Appl. No. 17/072,416, inventors Taylor; Roscoe W. et al., filed on Oct. 16, 2020.
Co-pending U.S. Appl. No. 17/239,041, inventors Hardmanned; J. et al., filed on Apr. 23, 2021.
Co-pending U.S. Appl. No. 17/245,296, inventors Johnsonpeter; L. et al., filed on Apr. 30, 2021.
Co-pending U.S. Appl. No. 17/329,532, inventors Taylorroscoe; W. et al., filed on May 25, 2021.
Co-pending U.S. Appl. No. 17/412,913, inventors Johnson; Peter L. et al., filed on Aug. 26, 2021.
Co-pending U.S. Appl. No. 17/473,106, inventors Taylorroscoe; W. et al., filed on Sep. 13, 2021.
Co-pending U.S. Appl. No. 17/487,982, inventors Hoermannalexander; F. et al., filed on Sep. 28, 2021.
Co-pending U.S. Appl. No. 17/529,928, inventors Hardmanned; J. et al., filed on Nov. 18, 2021.
Co-pending U.S. Appl. No. 17/741,161, inventors Hoermann; Alexander F. et al., filed on May 10, 2022.
Co-pending U.S. Appl. No. 17/862,242, inventors Hardman; Ned J. et al., filed on Jul. 11, 2022.
Co-pending U.S. Appl. No. 17/938,304, inventors Roscoe; W. Taylor et al., filed on Oct. 5, 2022.
Co-pending U.S. Appl. No. 17/938,591, inventors Alexander; F. Hoermann et al., filed on Oct. 6, 2022.
Co-pending U.S. Appl. No. 18/066,929, inventor Alexander; F. Hoermann, filed on Dec. 15, 2022.
Co-pending U.S. Appl. No. 18/137,918, inventors John; Jared Moss et al., filed on Apr. 21, 2023.
Co-pending U.S. Appl. No. 18/172,835, inventor Ned; J. Hardman, filed on Feb. 22, 2023.
Co-pending U.S. Appl. No. 18/205,384, inventors Ned; J. Hardman et al., filed on Jun. 2, 2023.
Co-pending U.S. Application No. 18/233, 129, inventors Alexander; F. Hoermann et al., filed on Aug. 11, 2023.
Co-pending U.S. Appl. No. 18/295,584, inventors Robert; J. Hanson et al., filed on Apr. 4, 2023.
Database WPI, Week 200323, 2017 Clarivate Analytics. Thomson Scientific, London, GB; Database accession No. 2003-239603, XP002781693.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.

(56) References Cited

OTHER PUBLICATIONS

EP18869902.9 Extended European Search Report dated Mar. 19, 2021.
EP19780959.3 Extended European Search Report dated Dec. 21, 2021.
Frenklach, et al., Silicon carbide and the origin of interstellar carbon grains. Nature, vol. 339; May 18, 1989: 196-198.
Gomez-Pozuelo, et al., Hydrogen production by catalytic methane decomposition over rice husk derived silica. Fuel, Dec. 15, 2021; 306: 121697.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
PCT/US2021/053371 International Search Report and Written Opinion dated Feb. 17, 2022.
PCT/US2022/045451 International Search Report and Wrtitten Opinion dated Feb. 17, 2023.
PCT/US2023/010695 International Search Report and Written Opinion dated Jun. 22, 2023.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
U.S. Appl. No. 16/657,386 Notice of Allowance dated May 20, 2022.
U.S. Appl. No. 14/591,528 Office Action dated Sep. 11, 2020.
U.S. Appl. No. 14/610,299 Notice of Allowance dated Dec. 13, 2021.
U.S. Appl. No. 14/610,299 Notice of Allowance dated Nov. 16, 2021.
U.S. Appl. No. 14/610,299 Office Action dated Feb. 17, 2021.
U.S. Appl. No. 15/229,608 Office Action dated Apr. 4, 2022.
U.S. Appl. No. 15/229,608 Office Action dated Feb. 1, 2021.
U.S. Appl. No. 15/229,608 Office Action dated Jun. 29, 2023.
U.S. Appl. No. 15/229,608 Office Action dated May 15, 2020.
U.S. Appl. No. 15/229,608 Office Action dated Nov. 28, 2022.
U.S. Appl. No. 15/259,884 Office Action dated Jun. 18, 2021.
U.S. Appl. No. 15/259,884 Office Action dated Mar. 4, 2022.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/410,283 Office Action dated Jul. 31, 2020.
U.S. Appl. No. 15/548,346 Office Action dated Jul. 16, 2021.
U.S. Appl. No. 15/548,346 Office Action dated Jun. 5, 2023.
U.S. Appl. No. 15/548,346 Office Action dated Mar. 18, 2022.
U.S. Appl. No. 15/548,346 Office Action dated May 4, 2020.
U.S. Appl. No. 15/548,346 Office Action dated Oct. 3, 2022.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Sep. 21, 2021.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Office Action dated Dec. 15, 2020.
U.S. Appl. No. 16/445,727 Notice of Allowance dated Feb. 2, 2023.
U.S. Appl. No. 16/445,727 Notice of Allowance dated Oct. 26, 2022.
U.S. Appl. No. 16/445,727 Office Action dated Apr. 15, 2022.
U.S. Appl. No. 16/445,727 Office Action dated Aug. 17, 2021.
U.S. Appl. No. 16/563,008 Office Action dated Jul. 25, 2022.
U.S. Appl. No. 16/563,008 Office Action dated Mar. 16, 2023.
U.S. Appl. No. 16/657,386 Notice of Allowance dated Mar. 10, 2023.
U.S. Appl. No. 16/657,386 Office Action dated Nov. 12, 2021.
U.S. Appl. No. 16/657,386 Office Action dated Sep. 16, 2022.
U.S. Appl. No. 16/802,174 Office Action dated Aug. 31, 2022.
U.S. Serial No. 16/802, 174 Office Action dated Feb. 16, 2022.
U.S. Serial No. 16/802, 190 Office Action dated Apr. 19, 2023.
U.S. Serial No. 16/802, 190 Office Action dated Oct. 5, 2022.
U.S. Appl. No. 16/802,212 Office Action dated Jul. 17, 2023.
U.S. Appl. No. 16/802,212 Office Action dated Sep. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/892,199 Notice of Allowance dated Jan. 23, 2023.
U.S. Appl. No. 16/892,199 Notice of Allowance dated Jan. 31, 2023.
U.S. Appl. No. 16/892,199 Office Action dated Jun. 27, 2022.
U.S. Appl. No. 17/062,075 Office Action dated Jun. 14, 2023.
U.S. Appl. No. 17/498,693 Office Action dated Apr. 3, 2023.
U.S. Appl. No. 17/565,864 Office Action dated Aug. 15, 2023.
U.S. Appl. No. 17/669,183 Office Action dated Aug. 23, 2023.
U.S. Appl. No. 17/817,482 Office Action dated Mar. 29, 2023.
U.S. Appl. No. 18/046,723 Notice of Allowance dated Apr. 12, 2023.
U.S. Appl. No. 18/046,723 Notice of Allowance dated Apr. 19, 2023.
U.S. Appl. No. 18/046,723 Notice of Allowance dated Aug. 7, 2023.
U.S. Appl. No. 16/802,190 Office Action dated Jan. 31, 2022.
What is Carbon Black, Orion Engineered Carbons, (Year: 2015).

\* cited by examiner

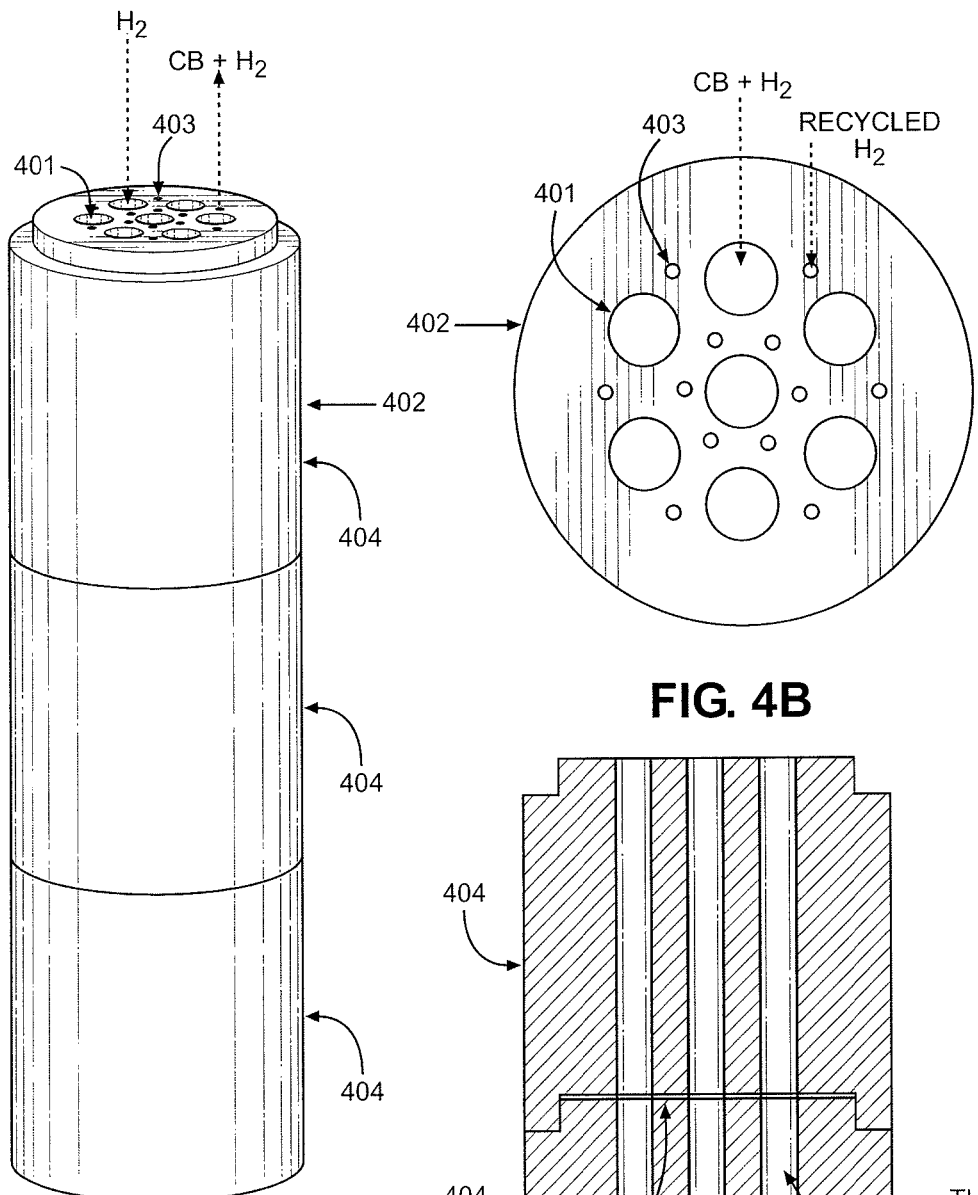
FIG. 4B
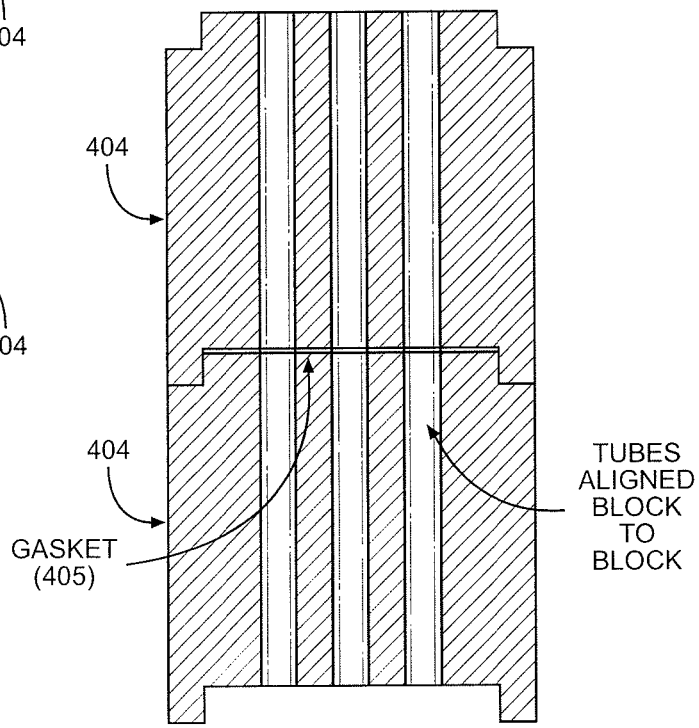
FIG. 4A
FIG. 4C

HIGH TEMPERATURE HEAT INTEGRATION METHOD OF MAKING CARBON BLACK

CROSS-REFERENCE TO RELATED APPLICATIONS

The present application claims priority of U.S. Provisional Application No. 62/209,017 filed Aug. 24, 2015, which may relate to subject matter disclosed in U.S. patent application Ser. No. 14/591,476, filed Jan. 7, 2015, which application claims the benefit under 35 U.S.C. § 119(e) of U.S. Provisional Application No. 61/933,497 filed Jan. 30, 2014. The entirety of each of the aforementioned applications is specifically incorporated herein by reference for all purposes.

TECHNICAL FIELD

The field of art to which this invention generally pertains is methods and apparatus for making use of electrical energy to affect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The systems described herein meet the challenges described above, and additionally attain more efficient and effective manufacturing process.

BRIEF SUMMARY

A heat exchanger particularly adapted for use in a plasma carbon black generating process is described, including a block of high temperature stable material, containing at least one first and at least one second independent fluid flow passageways through the material, and wherein the material can withstand sustained temperatures generated in a plasma carbon black generating process.

Additional embodiments include: the heat exchanger described above where the at least one first passage way has a diameter larger than that of the at least one second passage way; the heat exchanger described above where the material can withstand sustained temperatures of at least 1200° C.; the heat exchanger described above including multiple blocks of material integrally connected and stacked one on top of the other, where the at least one first passageway in each block of material is in fluid flow communication with the at least one first passageway in the other blocks of material, and the at least one second passageway in each block of material is in fluid flow communication with the at least one second passageway in the other blocks of material, and wherein the blocks of material are sealed so as to prevent any substantial loss of fluid between the individual blocks of material during use; the heat exchanger described above where the block of material comprises at least one of graphite, silicon carbide, a refractory metal, or high temperature ceramic material; the heat exchanger described above where the at least one first passageway has a diameter of at least 3 inches; the heat exchanger described above further contained in a insulated shell material; the heat exchanger described above where the blocks are compressed together by one or more vessel expansion joints; the heat exchanger described above where the block of material includes at least one material unable to withstand an oxidant containing stream at the sustained temperatures.

A method of making carbon black is also described, including reacting a carbon black forming feedstock with a hydrogen containing gas in a plasma reactor to produce effluent gas containing carbon black hydrogen and other constituents of the feedstock and plasma gas, recovering heat from the effluent gas for further processing, and recycling a portion of the hydrogen and other constituents of the feedstock and plasma gas back into the carbon black forming process, where the recycled portion of the hydrogen and other constituents of the feedstock and plasma gas are pre-heated in a heat exchanger to a temperature up to the reaction temperature before returning to the carbon black forming reactor.

Additional embodiments include: the method described above where the recycled hydrogen containing gas is pre-heated to a temperature of at least 1200° C.; the method described above where the recycled hydrogen is preheated to a temperature up to about 2500° C.; the method described above where the recycled hydrogen containing gas is pre-heated in the heat exchanger with effluent gas; the method described above where the heat exchanger additionally cools the effluent gas down to a temperature of 1000° C. or less; the method described above where the effluent gas is cooled in the heat exchanger by the hydrogen containing gas being recycled; the method described above where in the heat exchanger the hydrogen containing gas is at a higher pressure than the effluent gas; the method described above where in the heat exchanger the effluent gas flows in a direction opposite or counter current to that of the hydrogen containing gas; the method described above where in the heat exchanger the effluent gas flows in a direction cross-flow to that of the hydrogen containing gas; the method described above where the amount of hydrogen gas introduced into the heat exchanger is in excess of that required for heating and/or cracking the feedstock.

These and additional embodiments are further described below.

BRIEF DESCRIPTION OF THE DRAWINGS

FIGS. 4a, 4b and 4c depict heat exchanger embodiments described herein.

DETAILED DESCRIPTION

Figure 1:
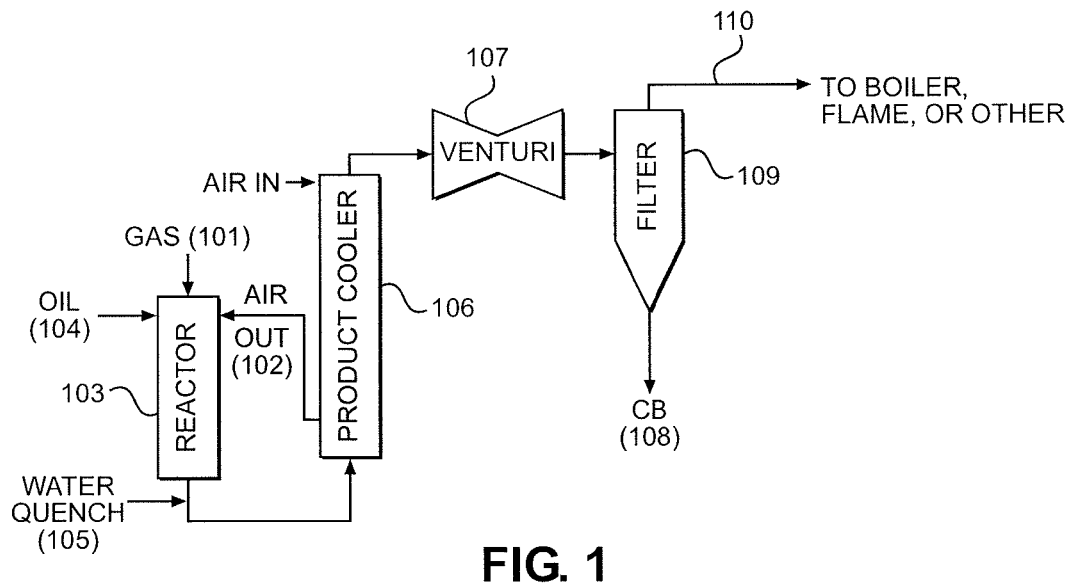
FIG. 1 depicts a typical furnace black process.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

The system and processes described herein use a heat exchanger constructed of a high temperature stable materials, for example, non-metallic materials, such as graphite, silicon carbide, or high temperature ceramics such as alumina, and/or a refractory metal, such as tungsten, which pre-heat recycled hydrogen containing gas in the plasma based carbon black process up to temperatures approaching reaction temperature in the reactor, specifically 1200° C. or higher, significantly reducing the electrical production load—MWh (mega-watt hours)/metric ton produced—of the process, as well as significantly reducing the size and capital expenses of downstream equipment in the recycle loop, including the product cooler, main unit filter, blower/compressor, and/or gas cleanup membrane system. This represents a significant integration of a high temperature stable material heat exchanger in a carbon black process with reactor gas effluent inlet temperatures above 1200° C. The system described herein can utilize inlet temperatures up to about 2500° C., with the sublimation or melting temperature of the heat exchanger material being the only limitation.

In typical furnace black production (shown in FIG. 1, for example), natural gas (101) is combusted with hot air (102) in the first section of a reactor (103), after which oil (104) is injected into the process, consuming the remaining air with the excess oil then cracking to form carbon black. The resulting tail gas, substantially comprising nitrogen, water vapor, carbon monoxide, hydrogen and other constituents known to those skilled in the art, and suspended carbon black is first cooled/quenched (stopping reaction) with a water quench spray (105), then in an air cooled product cooler (106), and finally with a venturi mixer (107) with more water prior to entering a main unit filter. Many known processes reduce the water injected with other heat recovery methods such as raising steam, heating the oil feedstock and others, so as not to waste the heat by evaporating water. The carbon black (108) drops through the bottom of the filter vessel (109) while the tail gas (110) is then conveyed to an end use, such as drying the product (wet process pelletization), a boiler or flare, or used otherwise in heat integration into the process such as firing a—oil feedstock heater. Hot air (102) from the product cooler is then used to fire the reactor burner, whose effluent then combusts and cracks the oil feedstock. The hotter this air is when entering the burner, the higher the efficiency of the reactor as the higher preheat reduces the natural gas consumption and increases the yield and throughput of the process. Typical air exit temperatures from product coolers are 650-800° C., though some newer plants use 950° C. air, achieving moderately better efficiencies, and future advances in technology may increase this limit further as metal technology continues to develop.

Figure 2:
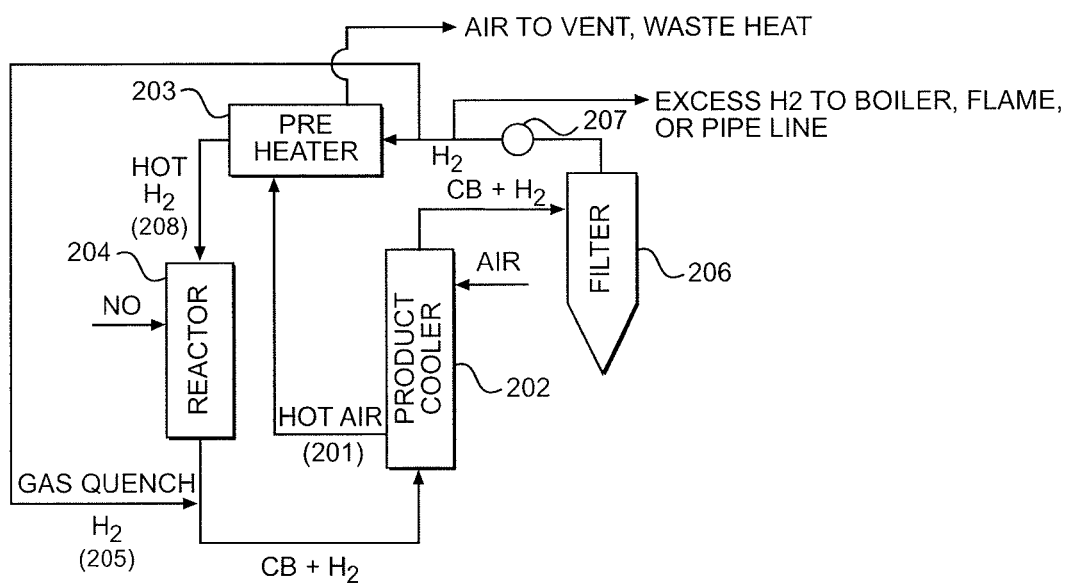
FIG. 2 depicts a plasma black process.

FIG. 2 depicts a plasma black process that cools the product to the filter temperature operating limit using a conventional air based heat exchanger (i.e., following the design of the heat exchanger shown in FIG. 1). The resulting hot air is then partially or wholly used to preheat the hydrogen used in the reactor, limiting the hydrogen temperature to less than that of the hot air, typically about 1000° C. Although there are no current plasma carbon black processes that operate this way, as depicted in FIG. 2, hot air (201) from the product cooler (202) is used to pre-heat (203) recycled hydrogen that is then conveyed into the plasma burner (204). The hotter the hydrogen is going into the plasma burner, the less electricity is consumed heating it up to its final temperature. Utilizing 900° C. air from the product cooler exhaust, for example, might make it possible to pre-heat the hydrogen containing plasma gas to around 800° C. When compared to not pre-heating the plasma gas and operating with a 3000° C. plasma, an 800° C. pre-heated stream of hydrogen could possibly require between 10-15% less electricity to achieve the same final temperature.

With the plasma design systems and methods described herein, recycled hydrogen can use the same plasma system described above, or could heat the hydrogen with the reactor effluent. These systems, using conventional metal heat exchangers, would still only deliver at most the same 950° C. preheat temperature used in the furnace process, rather than the up to 2500° C. that the heat exchangers as described herein may achieve.

As an additional benefit, the volume of gas required to be recirculated can be significantly reduced with the system described herein. The current plasma design referenced above uses recycled process gas (205) to quench the carbon black and hydrogen flow as it exits the reactor, reducing its temperature to within the inlet temperature limits (1050° C.) of conventional product coolers (202). Typically this quench flow is 1.5 times greater than the volume of plasma gas required. This volume of gas is then required to be cooled along with the products in the product cooler (202), filtered in the main unit filter (206), and compressed by the blower (207), increasing the size and power requirements of all of those downstream pieces of equipment.

Due to the dependency on electricity usage in heating hydrogen, pre-heating of the hydrogen is a strong lever to reducing total cost of production in the electric/natural gas production process. Previous efforts stopped short of doing a full heat integration, instead electing to reduce the exiting carbon black and hydrogen temperature with water cooling, boilers or gas quenches, matching the limitations of the traditional furnace process. The processes and systems described herein, instead takes advantage of the lack of oxidants in this plasma process which enables the use of unconventional materials that cannot survive an oxidant containing gas stream, such as ceramics like graphite, silicon carbide and refractory metals (tungsten, niobium, chrome etc). It also enables the use of materials with less than perfect sealing. In the furnace process this would result in air leaking into the tail gas and could create a destructive fire in the heat exchanger. Leaking the hydrogen containing plasma gas into the reactor effluent gasses creates no fire and so enables the use of materials which would otherwise have such sealing problems—for example alumina, magnesia, and chromium based refractories.

Figure 3:
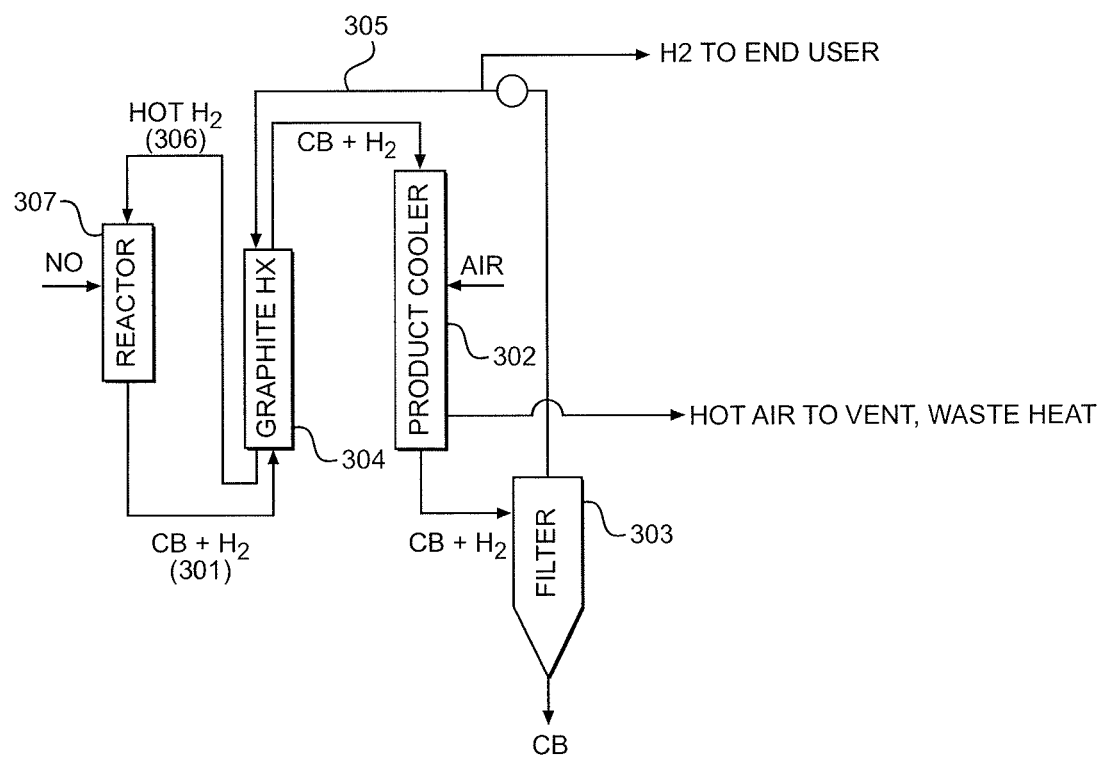
FIG. 3 depicts a plasma black process including the use of a heat exchanger embodiment described herein.

FIG. 3 depicts a plasma black process including the use of a heat exchanger embodiment enabling a much higher hydrogen temperature due to the higher temperature limits of the high temperature heat exchanger described herein. As described, a block heat exchanger (304) made from high temperature stable material that can operate at temperatures exceeding that of conventional metal heat exchangers, is used to cool the carbon black and effluent gasses (301) exiting the reactor (307) down to 1000° C. or less, where it can then enter a standard carbon black product cooling heat exchanger (302) or be filtered without such an exchanger. The coolant in the high temperature heat exchanger is the recycled hydrogen containing gas stream (rH$_2$ Stream (305)) which is at higher pressure than the carbon black/effluent gas product stream (CBH$_2$ stream (301)). The higher pressure is higher than what is coming out of the reactor so that any leak is into the reactor effluent gas rather than the other way around, which could then otherwise put carbon particles into parts of the system not designed to handle particles. Due to the superior heat transfer properties of hydrogen, the approach temperature of the cooling fluid can shrink relative to other systems increasing the maximum preheat of the hydrogen containing plasma gas stream (the approach temperature is the smallest temperature difference, either at the cold end of the heat exchanger (incoming plasma gas to be heated and effluent discharge temperature) or the hot end (incoming effluent and heated plasma gas temperature).

By using materials with a sufficiently high melting or sublimation point, for example graphite, the electric heating only needs to provide the enthalpy required to crack the natural gas, rather than that required to heat the plasma gas to the reaction temperature from the temperature required to compress or filter the plasma gas. In an ideal system for producing carbon black from natural gas, only the bond dissociation energy of methane would be required. However, to produce target grades of carbon black, the methane must be heated up to target reaction temperatures in excess of 1200° C. The closer this high temperature heat recovery (HTHR) system gets to re-heating the hydrogen to the reaction temperature required to make the desired carbon black quality, the closer the system gets to being that ideal system.

As described above, the HTHR system also either eliminates or significantly reduces the need for a quench gas at the outlet of the reactor. The required cooling load for the product cooler is also reduced by up to approximately 50%. Similarly, the required surface area sizing of the main unit filter (303, for example) is also reduced by up to approximately 50% and the required flow rate through the blower/compressor/gas cleaning system downstream of the filter is also reduced by a similar amount.

Two important requirements for the heat exchanger that cools the carbon black conveyed in the gas stream are (1) large diameter flow paths for the carbon black stream to prevent blockage and build up; and (2) low temperature differential between the material walls and the carbon black stream to prevent thermophoresis. While any diameter and temperature differential for the carbon black channels in the heat exchanger may be used which prevent blockage and carbon black build up in use, diameters of at least 3 inches and temperature differences between material and fluid of 300° C. or less have been found to be particularly useful. And while the carbon black channels can be the same size as the cooling channels, or even smaller, having the carbon black conveying channels of a larger diameter enables those channels to run cooler than if they were the same size as the cooling channels. In running cooler they should foul less and so enable a higher heat flux and smaller heat exchanger for a given heat duty. The diameter of the coolant fluid channel selected will of course depend on such things as relative fluid flow rates, material selected etc, so as to maintain a warm enough tube wall temperature in the carbon black fluid channels so as to eliminate or reduce the thermophoretic fouling from the presence of the carbon black particles. Representative diameters could be for example, 4 inches, 3 inches 2 inches, one inch, 0.5 inch, etc.

Similarly, the overall length and diameter of the heat exchangers used will depend on the size or scale of the process. Its internal surface area would be proportional to the production rate. For example, for small reactors as few as 30 carbon black flow channels could be sufficient, whereas commercial size units may require 144 carbon black flow channels or more.

To take advantage of the system described herein, at least a portion of the carbon black laden gas coming out of the reactor, and in most cases all of the carbon black laden gas coming out of the reactor, will be channeled through the heat exchangers described herein, which will then exchange heat with one or more other streams to preheat the other materials used in the process, or other fluid streams that utilize energy in the plant such as making steam, generating electricity, drying the product or other systems that can utilize heat.

The HTHR system described herein (see, for example, FIGS. 4a, 4b and 4c) utilizes the CBH$_2$ stream flowing through at least 2 inch diameter holes or channels (401) in a block (402), while the rH$_2$ stream would flow through the same size or smaller diameter holes (403) in a counter or cross (i.e., perpendicular to the effluent channels) flow direction so as to limit the cooling of the surfaces in contact with the reactor effluent and so limit thermophoresis fouling. By using a block heat exchanger as opposed to a tube in shell design, for example, the design can incorporate a much larger heat exchange surface for the potentially fouling carbon black containing stream when compared to the heat exchange surface exposed to the highly conductive hydrogen containing plasma gas stream.

Using a counter flow arrangement will achieve minimum approach temperature of the rH$_2$ to the CBH$_2$ stream and minimum exit temperature of the CBH$_2$ stream, but other flow arrangements, such as cross flow, would also work.

With the system and methods described herein, multiple identical blocks (404) can be stacked on top of one another with a keyed fit and with a graphite gasket (405) or other high temperature material gasket sealing the mating surfaces. Due to the similar chemical composition of each stream even an imperfect seal would be sufficient. The individual blocks would be aligned (406) so as to provide continuous fluid flow from the holes or channels from one block to the next.

The rH$_2$ stream would be held at higher pressure than the CBH$_2$ stream, ensuring that if any leakage or communication did occur between the streams, it would be with clean rH$_2$ going into the CBH$_2$ stream, which would have negligible impact on the process conditions and maintain the rH$_2$ system free of carbon black.

Figure 5:
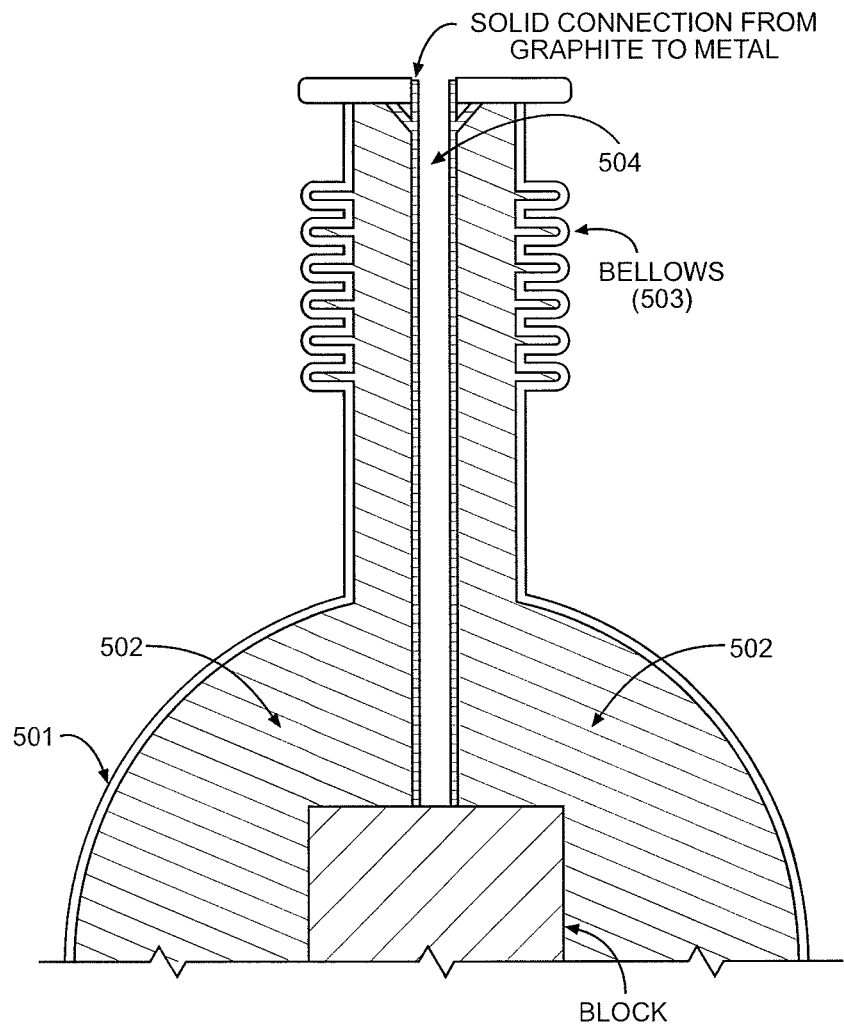
FIG. 5 depicts a vessel containing a heat exchanger embodiment described herein.

As described herein, the heat exchanger block stack could be contained (see, for example, FIG. 5) within a pressure containing vessel (501) constructed of metal, with high temperature insulation (502) between the heat exchange material and the containment shell protecting the metal from the block temperature and also constraining and aligning the blocks. The blocks may be compressed downward using a vessel expansion joint (503) that will maintain the required compressive forces to seal the joints between the blocks both when hot or cold. High temperature, for example, graphite and/or ceramic insulation would also protect the expansion joints from high temperatures. There could also be more than one vertically extending pipe (504) coming in and out of the metal vessel for the two streams.

The thermal mass of reactor effluent will always exceed that of the recycled hydrogen, as the reactor generates black and additional hydrogen. Consequently, the system as described herein, will always result in a larger temperature increase in the rH$_2$ stream than the drop in the CBH$_2$ stream. The result of this is that the cold end of the heat exchanger will have a larger temperature difference than the hot end.

In one embodiment, flowing more rH$_2$ than is needed by the process can eliminate this increasing temperature difference, and serve as a variable to maintain a constant temperature difference along the length of the exchanger, and in doing so minimize thermophoretic fouling. The plasma gas temperature will depend on the discharge temperature of the blower. The hot temperature will depend on the materials of the heat exchanger. The higher the hot temperature and the lower the blower discharge temperature the less the % of flow increase. Preferably the additional hydrogen will form a separate stream that can then realize value from the additional heat when the surplus stream gets sold as a fuel, or used to heat something else. Even if the heat gets rejected to atmosphere the benefit in terms of the heat exchanger operation and the impact on fouling should make this feature valuable.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
    (a) producing, from a hydrocarbon feedstock in a reactor, an effluent gas comprising carbon particles and hydrogen;
    (b) directing the effluent gas to a heat exchanger;
    (c) separating at least a portion of the hydrogen from the effluent gas, thereby obtaining separated hydrogen;
    (d) preheating the separated hydrogen in the heat exchanger to (i) at least 1200° C. or (ii) a temperature up to a reaction temperature in the reactor, thereby obtaining preheated hydrogen, wherein the heat exchanger comprises graphite; and
    (e) providing the preheated hydrogen to the reactor.

2. The method of claim 1, wherein the separated hydrogen is preheated to a temperature up to about 2500° C.

3. The method of claim 1, wherein the heat exchanger additionally cools the effluent gas down to a temperature of 1000° C. or less.

4. The method of claim 1, wherein, in the heat exchanger, the separated hydrogen is at a higher pressure than the effluent gas.

5. The method of claim 1, wherein, in the heat exchanger, the effluent gas flows in a direction counter-current to that of the separated hydrogen.

6. The method of claim 1, wherein, in the heat exchanger, the effluent gas flows in a direction cross-flow to that of the separated hydrogen.

7. The method of claim 1, wherein an amount of the separated hydrogen introduced into the heat exchanger is in excess of that required for heating and/or cracking the hydrocarbon feedstock.

8. The method of claim 1, wherein, in step (a), the producing of the carbon particles comprises reacting the hydrocarbon feedstock with a hydrogen-containing gas in the reactor.

9. The method of claim 1, further comprising using electric heating to crack the hydrocarbon feedstock.

10. The method of claim 1, wherein the reactor is a plasma reactor.

11. The method of claim 1, wherein the carbon particles include carbon black.

12. The method of claim 1, wherein the preheated hydrogen is provided to the reactor as a plasma gas.

13. The method of claim 1, wherein in (a), the effluent gas comprising the carbon particles and the hydrogen is produced by a plasma process.

* * * * *